United States Patent [19]

Coppens et al.

[11] Patent Number: 4,704,337

[45] Date of Patent: Nov. 3, 1987

[54] RUBBER ADHERABLE STEEL REINFORCING ELEMENTS WITH COMPOSITE SURFACE COATING

[76] Inventors: Wilfried Coppens, C. Verschaevestraat 7, B- 8510 Kortrijk; Hugo Lievens, Coupure 403, B- 9000 Gent, both of Belgium

[21] Appl. No.: 816,269

[22] Filed: Jan. 6, 1986

[30] Foreign Application Priority Data

Jan. 7, 1985 [GB] United Kingdom ................ 8500323

[51] Int. Cl.$^4$ ............................................. B32B 15/08
[52] U.S. Cl. .................................... 428/625; 428/662; 428/663; 428/677; 57/902; 152/451; 152/565
[58] Field of Search ............... 428/677, 675, 625, 592, 428/663, 607, 662; 152/451, 527, 565; 57/902

[56] References Cited

U.S. PATENT DOCUMENTS

| | | | |
|---|---|---|---|
| 1,078,906 | 11/1913 | Eldred | 428/677 |
| 2,154,834 | 4/1939 | Lamatter | 428/625 |
| 3,438,755 | 4/1969 | Millhoff | 428/677 |
| 3,749,558 | 7/1973 | Dillenschneider | 428/677 |
| 3,858,635 | 1/1975 | Nakamoto et al. | 428/677 |
| 4,143,209 | 5/1979 | Gerspacher et al. | 428/592 |
| 4,226,918 | 10/1980 | Friend | 428/625 |
| 4,297,159 | 10/1981 | Dobias et al. | 428/625 |
| 4,299,640 | 10/1981 | Erickson | 156/110 C |
| 4,446,198 | 5/1984 | Shemenski et al. | 428/625 |

FOREIGN PATENT DOCUMENTS 2011501 1/1979 United Kingdom .

OTHER PUBLICATIONS

"Fundamental Aspects of Rubber Adhesion to Brass--Plated Steel Tire Cords", Van Ooij, W. J., 346 Rubber Chem. and Tech., vol. 52, No. 3 (1979-7108), pp. 605-643.

*Primary Examiner*—L. Dewayne Rutledge
*Assistant Examiner*—John J. Zimmerman
*Attorney, Agent, or Firm*—Shlesinger, Arkwright & Garvey

[57] ABSTRACT

A steel element for reinforcing a rubber article comprises a brass layer and at least one additional outer film of metal or metal alloy selected from the group containing Fe, Ni, Mn, Cr, Mb, Va, Ti, Zi, Nb, Ta, Hf and W.

16 Claims, No Drawings

RUBBER ADHERABLE STEEL REINFORCING ELEMENTS WITH COMPOSITE SURFACE COATING

BACKGROUND OF THE INVENTION

The present invention relates to steel elements which can be used for reinforcing vulcanized elastomeric articles based on natural or synthetic rubber, such as tires, belts, hoses, straps and like products.

More particularly, it relates to rubber adherable steel elements for reinforcing rubber articles which are vulcanizable with sulphur, such as e.g. vehicle tires. These reinforcing elements are generally covered with a brass coating, thereby providing better adhesion to the rubber.

The term steel reinforcing elements as used herein is intended to be generic to all steel products suitable for strengthening rubber articles, including wires, filaments, strands, cables, tire cords, steel plates, shaped wire products and combinations thereof without being limited thereto.

The term steel refers to what is commonly known as high carbon steel, i.e. iron-carbon alloys containing from 0.4 to 1.4% carbon, usually from 0.6 to 1% C, and which may contain additional alloying elements in varying amounts.

The term brass refers to an alloy substantially of copper and zinc, the composition of which can also include other metals in varying lesser amounts. The copper content of a rubber adherable brass composition can range from 50 to 99% by weight, but in the majority of cases, such as e.g. in bonding steel cord to rubber components for tires, a copper content ranging from 55 to 75% is now regarded as being most suitable by those skilled in the art.

Hence, the wide-spread practice of vulcanization of rubber onto a brass plated metal substrate is now extensively applied in manufacturing steel reinforced rubber articles, and in particular the use of brassed steel cord for tire materials is well known.

Steel cord for use in tire applications is normally made by twisting or cabling together brassplated high-carbon steel wires, drawn to a filament diameter of from about 0.10 to 0.50 mm. The brass alloy coating usually comprises 60 to 75% Cu and 40 to 25% Zn; the plating thickness may range from 0.05 to 0.50 $\mu m$, preferably from 0.10 to 0.35 $\mu m$. In practice, the specific composition and thickness of the brass alloy coating on the wire are restricted by the adhesion requirements for a given rubber compound and by wire manufacturing considerations. Hence, brass composition and plating thickness are optimized in each case to obtain maximum "initial" adhesion (i.e. just after vulcanization) and to afford good wire drawability, given the large deformation and friction imposed on the coating during the final wire manufacturing steps. For this purpose it is advisable to have a brass alloy with homogeneous $\alpha$-structure, i.e. a composition which is substantially free of the $\beta$-phase (a hard and less deformable crystal type) which gradually appears below 62–63% Cu, and even from below 65% Cu in less homogeneous Cu-Zn alloy deposits.

At present, the dual requirement of securing an adequate initial rubber to steel adhesion and of facilitating the drawing of the wire is reasonably well solved by known brass coatings and forms part of the state of the art. However, maintaining a sufficiently high post-cured adhesion level during the service life of the rubber article, e.g. during the running life of the tire, is still a major problem in the industry. It has been observed that moisture is generally very detrimental to the adhesion between the brass plated steel reinforcing element and the rubber article. Variation of water content in the unvulcanized rubber compound, for instance, is already known to be a problem. Of even greater importance is the effect of humidity (water pick-up) and heat after curing on degradation of the adhesive bond, especially during the service life of the steel cord reinforced rubber article, e.g. a tire subject to harsh driving conditions. In fact, it has been acknowledged by tire specialists and cord manufacturers that adhesion retention is severely affected by humidity ageing and related effects causing degradation, involving heat corrosion, and that a high initial adhesion level achieved for a given brass coating is no guarantee of maintaining a satisfactory adhesion level during the lifetime of e.g. a tire. Seeking optimization of the brass coating, in particular a solution to the humidity ageing problems for a given rubber compound, results in most cases in the use of thinner brass layers with low copper content. Unfortunately, this solution suffers from some practical difficulties, such as e.g. a lower initial adhesion, corrosion problems and poor wire drawability, especially when the brass composition has a copper content below 65%.

In the past, a number of attempts have been made to solve the difficulties posed by the presence of moisture and by the simultaneous action of humidity and heat.

These trials include the modification of the brass coating by alloying Cu-Zn with different metals, such as Co, Ni, Pb, Sn and even Fe, so as to obtain a homogeneous ternary brass alloy. Other proposals include the deposition of a protective metal layer of Ni or Zn between the steel substrate and the brass coating, the treatment of the brass surface with various chemicals to clean the brass surface in depth and/or modification of the outermost layer with adhesion promoters and/or corrosion inhibitors. In addition the deposition of a thin corrosion resistant metal film of zinc and the alloying of the brass surface with cobalt have been proposed.

A number of these methods are described in the following prior art documents:

U.S. Pat. No. 3,858,635 proposes the use of Sn, Pb and the like.

U.S. Pat. No. 3,749,558 describes the use of Cu-Ni and Cu-Ni Zn coatings

U.S. Pat. No. 4,299,640 proposes the treatment of the brass surface with certain amino carboxylic acids and their salts.

U.K. Pat. No. 2,011,501A describes the use of ternary brass alloy coatings containing Cu, Zn and Co.

U.S. Pat. No. 2,076,320 describes brass-coated metal objects with a high cobalt concentration gradient on their surface.

U.S. Pat. No. 4,143,209 describes a process for plating a brass-coated wire with a zinc layer.

U.S. Pat. No. 4,446,198 reveals a ternary brass alloy coating containing Cu, Zn and Fe.

Some of these attempts have been successful in solving one or another specific aspect of the brass to rubber adhesion problem. However, there still remain deficiencies and uncertainties.

In practice, the use of ternary brass alloy coatings is less reliable because of more frequent compositional fluctuations, a complex process, and the difficulty in maintaining close tolerances over a long manufacturing period. When using low melting-point metals on top of the brassed wire, it is found that they migrate to a variable degree in the brass layer during the wire drawing process. Cobalt deposits are expensive, less deformable and sometimes detrimental, depending on vulcanization conditions and rubber type.

Thus, none of the proposed methods to prevent loss of rubber adhesion to conventionally prepared wires or to wires with modified brass coating are sufficiently successful to find widespread commercial use. They are often unable to tackle the stated problem in its entirety, i.e. the pursuit of adhesion retention under varying working conditions when combining brass coatings and rubber compounds of different origin, preferably without sacrificing too much in terms of manufacturing reliability and wire cost.

OBJECTS AND SUMMARY OF THE INVENTION

Accordingly, it is an object of the present invention to provide a novel composite brass coating capable of improving adhesion retention in various rubber compounds after curing.

According to the present invention, a steel element for reinforcing rubber articles has a rubber adherable coating comprising a layer of a copper-zinc alloy containing at least 50% of copper, and at least one additional separate outer film of a metal or a metal alloy selected from the group containing iron, nickel, manganese, chromium, molybdenum, vanadium, titanium, zirconium, niobium, tantalum, hafnium and tungsten, said outer film having a thickness of from 0.0005 to 0.05 $\mu$m.

The separate film is, preferably, prepared by electrolytic plating of a single metal or a metal alloy selected from the group comprising iron, nickel, manganese and chromium, and said separate film has a thickness ranging from 0.0005 to 0.05 $\mu$m, preferably from 0.001 to 0.020 $\mu$m. When considering also special deposition techniques, the group of suitable metallic top coatings can be extended to include other high-melting metals such as vanadium, titanium, tungsten, zirconium, niobium, hafnium, molybdenum and tantalum. Such metals can be applied by vacuum deposition techniques (chemical, vapour deposition, sputtering, ion plating, etc.), by electrodeposition from molten salts or by electroplating from specialty non-aqueous solutions.

For carrying the present invention into effect, it is particularly advantageous to select the metals iron, nickel and manganese and most preferably iron, nickel and nickel-iron alloys, said metals being easily electroplated and showing good deformability.

The outer film may be a single metal layer of iron, nickel or manganese or a binary alloy such as NiFe, NiMn or NiCr. The outer film may have a thickness of from 0.001 to 0.02 $\mu$m, and the brass layer a thickness of from 0.05 $\mu$m to 0.5 $\mu$m, or preferably from 0.1 to 0.35 $\mu$m, the brass comprising from 55 to 75% of copper.

When the element is a wire, it may have a typical diameter of from 0.08 to 0.5 mm and a tensile strength of at least 2500 N/mm$^2$. The wire may be twisted with other wires to form a steel cord. The cord may be made from wires already covered with the composite coating, or the outer film may be applied to the cord after the brassed wires are twisted together. As a result, it may not be necessary for all the wires forming the cord to be provided with the outer film, depending on the cord construction. Alternatively, when the wire is coated before twisting, the outer film may be provided either at an intermediate stage before the wire is drawn to its final size, or after such a drawing step. Additionally, the brass layer may include an additional ternary alloying component.

It has now been found that steel wire and steel cord plated with a composite brass coating exhibit an improved resistance to adhesion degradation when embedded in a vulcanized rubber article and exposed to moisture and heat, which is rather surprising in the light of the prior art experiences and knowledge.

As a consequence, plated cords, which are a specific embodiment of this invention, are very useful for reinforcing rubber tire material, because vehicle tires are often subject to heat build-up and water pick-up during running.

To simulate tire-exposure conditions involving heat and humidity, test samples of steel cord encased in different tire rubber compounds were prepared and after vulcanization held for a given time in a wet ageing environment (95% relative humidity at about 70°–80° C.; humidity ageing), or in a steam atmosphere (steam ageing at 120° C.). After ageing the well-known TCAT-test (Tire Cord Adhesion Test) was carried out which measures the pull-out force or the adhesion to rubber of the cords.

A steel substrate such as e.g. a high carbon steel wire for tire cord may be treated as follows to obtain a multi-layer composite coating:

1. Heat treatment (patenting) at an intermediate wire size
2. Pickling and rinsing
3. Brass plating
4. Rinsing and pretreatment of the brass surface
5. Deposition of at least one additional metal layer
6. Rinsing and drying
7. Wire drawing to a fine wire size and twisting the wires into cords.

Variations of this process are of course possible. For instance, the inner brass coating can be obtained from an electrolytic brass alloy plating bath or can be prepared by depositing two successive layers of copper and zinc onto the steel wire followed by heating the coated wire to form a diffused brass alloy layer. In any case, a homogeneous brass alloy is present before applying the separate outer metal layer so as to form a composite adhesion coating. For tire applications the brass alloy coating, forming here the inner layer of the new composite coating, has a copper content from 55 to 75%, preferably from 60 to 72%, and a thickness ranging from 0.05 to 0.50 $\mu$m, preferably from 0.12 to 0.35 $\mu$m.

An alternative method to produce a composite brass coated wire material is to apply at least one separate metal film on the drawn brassed wire or on the finished cord.

The metal layer or layers on top of the brass can be a single metal chosen from iron, nickel, manganese, chromium, molybdenum, tungsten, zirconium, tantalum, titanium or an alloy of these metals. Preferably, the top coating consists of one layer of a metal selected from iron, nickel, chromium or manganese or of a binary alloy of these elements (Ni-Fe, Ni-M, Ni-Cr, Fe-Cr, etc.), and most preferably of Fe, Ni, Mn or Ni-Fe or Ni-Mn alloy. In fact, the most preferred metals are those which are readily electroplated, are not expensive and exhibit a good plastic deformation capacity. The thickness of the plated toplayer ranges from 0.0005 to 0.050 $\mu$m, preferably from 0.001 to 0.020 $\mu$m. Below a lower limit of 0.0005 μm it is difficult to achieve or to maintain a uniform surface coverage, and above 0.05 μm it becomes difficult to draw the wire without disturbing the composite coating constituents and to control the adhesion reaction.

The use of a composite brass coating instead of a ternary brass alloy containing one of the previously mentioned metals as ternary alloying elements has the advantage that the selected metal doesn't interfere with the Cu-Zn-diffusion treatment or the brass alloy plating procedure. There is less metal needed because it is not distributed in the much thicker brass coating, the obtainable effect is significantly larger because the metal film is present in a concentrated amount at the interface between rubber and brass and it is effective on thin as well as on thick brass layers.

It is not quite clear why a composite brass coating is so unexpectedly beneficial with respect to adhesion retention after vulcanization and humidity ageing.

A possible explanation may be found by studying the theory of rubber to brass adhesion. According to this theory, generally agreed upon by those skilled in the art, the adhesion of rubber to brass is dependent upon a bond between the copper in the brass and the sulphur in the rubber. It is believed that this bond involves the formation of polysulphur metal bridges of the type $Cu-S_x$-rubber and of a thin layer of cupreous sulphide at the brass rubber interface. When humidity and heat intervene after vulcanization, the curing reaction may proceed further (probably by catalytic activation of copper in the presence of water and heat, this is the overcuring effect). As a result of the continued reaction between copper and sulphur, more cupreous sulphide is formed at the brass/rubber interface than is needed for maximum adhesion and the thickened $Cu_2S$-layer become friable, thereby facilitating interface debonding. It is also possible that the postcuring reactions locally destruct a lot of adhesion bridges (sulphur consumption for $Cu_2S$ and even $CuS$-formation) and that it weakens the rubber interface by sulphur liberation and migration. These combined effects induce adhesion degradation, which may continue with ageing, as long as there is enough copper and sulphur available. This has been confirmed in practice by investigating adhesion levels of humidity aged rubber to cord bonds: indeed thick brass coatings and high-Cu brass compositions were found to give poorer adhesion retention. When using a brass composite coating, adhesion deterioration by postcure moisture and heat accumulation effects can be slowed down to a significant extent. This rather unexpected result, caused by the presence of a separate thin film of the specified metals or alloys on top of the brass, may be explained by diffusion barrier action any by its regulating effect on Cu-activity and on the interfacial $Cu_2S$-reaction. It is plausible that the selected metals, which have two things in common—namely a rather slow diffusability in brass and a sulphide forming capacity—are the most suitable for this purpose.

Further advantages of the improved resistance of the composite-brass coating material to rubber bond deterioration by postcure heat and humidity are related to new processes and applications involving high-temperature curing. This short-cycle vulcanization method carried out at a rather elevated temperature (typically above 160° C.) is generally too critical for conventional brass coatings.

The reinforcing steel elements, such as e.g. wire, cable tire and cord, produced from the coated steel substrates, can be incorporated into a variety of rubber articles such as tire, hose, conveyor belt and the like. Of course, high-duty tires such as heavy-load truck tires, long lasting tires suitable for remolding and other high-performance tires requiring improved adhesion retention are preferred articles to be strengthened by the reinforcing elements of this invention, which can be encased in various reinforcement plies, such as tire-carcass plies, tire belt, breaker piles and chippers.

DETAILED DESCRIPTION OF THE INVENTION

Such embodiments of the invention will now be described with reference to the following Examples and description:

A conventional brass-plated wire or cord process is adapted to produce the composite-brass coating previously described. For this purpose, the wire substrate, after the last brass deposition which typically comprises the alternate electroplating of a copper layer and a zinc layer followed by thermal diffusion to form a brass alloy layer of the prescribed composition and thickness, is chemically pretreated to activate its brassed surface and next is covered with a thin metal or binary metal alloy film selected from Fe, Ni, Mn and the like (preferably Fe, Ni, Ni-Fe or Ni-Mn) by moving the pretreated wire through an electrolytic bath of the selected metal or alloy. Depending on the metal or alloy plate, electroplating solutions may be prepared from various electrolytes: a chloride bath, a sulphate bath, a sulfamate bath, a fluoroborate bath or a cyanide bath. Adequate activation of the brass alloy coated substrate is needed to obtain good surface coverage and adherence of the plated metal film. Therefore, the brassed substrate is chemically pretreated, such as e.g. in a peroxide based solution, in a potassium pyrophosphate bath (e.g. aqueous solution with 100 g/l of $K_4P_2O_7$ at 50° C.), in a dilute phosphoric acid or in a citric acid bath and the like.

The adhesion tests were carried out on vulcanized rubber samples containing steel cord of $2+2\times0.25$ mm construction. A prior art standard cord of this type was prepared as follows: patented 0.70% C-steel wires of 1.25 mm diameter were covered electrolytically with a prescribed amount of copper and zinc and suitably heated to form a 0.95 μm thick difffused brass alloy coating containing 65% copper and 35% zinc. The wires were then drawn to a diameter of 0.25 mm whereby the brass layer was reduced to a thickness of about 0.19 μm. These wires were twisted together to form a strand of $2+2\times0.25$ mm. In addition to this standard cord, similar cords were produced from the same wire material, which cords were provided with various conventional and composite brass coatings. These cord samples are described in the following examples, which include comparative examination of their adhesion behaviour in a number of rubber compounds, in particular their capability to resist bond degradation by humidity ageing.

Starting with the same wire material as for standard cords, the wire being first covered with a brass diffusion alloy coating, two different composite-brass coated cords were prepared, one with an iron and one with a nickel top layer respectively.

EXAMPLE 1

Patented steel wires of 1.25 mm diameter, just after forming the brass alloy coating, were pretreated in a cold phosphoric acid solution and subsequently covered electrolytically from, in one case, a ferrous sulphate bath (290 g/l FeSO4. 7 aq; 10 g/l NaCl; pH=2.5; 50° C.) to produce a thin iron film of 0.028 μm, whereas in the other case, a thin Ni-film was plated (by a Watts bath) on the brass coating. After wire drawing to 0.25 mm and a tensile strength greater than 2800 N/mm², and twisting the wires to cords 2+2×0.25 mm, the composite adhesion coating on the cord surface displayed a two-layer composition consisting of a brass layer of 0.19 μm and of an iron layer, or a nickel layer, respectively, of about 0.005 μm. Those cords were embedded in rubber and vulcanized to form test samples of which the initial adhesion and humidity aged adhesion (48 hours at 77° C. in 90% relative humidity atmosphere) were determined. The used rubber compound was a commercial tire rubber (compound A1 of tyre builder A).

TABLE 1

Adhesion results of 2 + 2 × 0.25
cord in tire rubber compound A1

| Coating type | Adhesion force (in Newtons) | |
|---|---|---|
| | initial | aged humidly |
| (1) 0.19 μm brass 64.5 Cu − 35.5 Zn | 422 | 149 |
| composite coatings | | |
| (2) brass 0.19 μm as (1) + 0.005 μm Fe film | 433 | 203 |
| (3) brass 0.19 μm as (1) + 0.005 μm Ni film | 440 | 230 |

The results demonstrate the superiority of the composite adhesion coating over the conventional brass coating (1) in adhesion retention. The composite brass coating displays also a favorable initial adhesion level.

EXAMPLE 2

In a second series of tests (using 0.25 mm wire and 2+2×0.25 mm cord) the conventional brass diffusion coating has been changed in composition and thickness, and is compared with a composite coating containing the same brass alloy covered by a thin metal film of iron or nickel. The postcure adhesion level was determined after the steam ageing of vulcanized rubberized cord samples at 120° C. (rubber compound A2 of tire builder A). The basic brass alloy compositon contained 70% of copper and 30% of zinc.

TABLE 2

Adhesion results before and after
steam ageing (2 + 2 × 0.25 mm cord)

| Type of coating (70 Cu − 30 Zn alloy) | Adhesion force (Newtons) | | |
|---|---|---|---|
| | | steam aged at 120° C. | |
| | initial | 12 hrs | 24 hrs |
| Conventional | | | |
| 0.15 um brass | 320 | 310 | 237 |
| 0.25 um brass | 290 | 278 | 225 |
| Composite coating | | | |
| 0.15 um brass + 0.0012 um Fe | 370 | 325 | 251 |
| 0.25 um brass + 0.0020 um Fe | 380 | 355 | 270 |
| 0.15 um brass + 0.005 um Ni | 340 | 315 | 269 |
| 0.25 um brass + 0.005 um Ni | 377 | 387 | 296 |

It can be seen that a very thin surface film of iron or nickel is already effective in improving adhesion retention after steam ageing.

EXAMPLE 3

In this example cords 2+2×0.25 mm, embedded in the same rubber compound as used in example 2, are vulcanized at 160° C. for different cure times in order to assess the adhesion behaviour in overcuring conditions. Conventional diffusion brass coatings of varying composition are compared with composite coatings. The results are summarized in table 3.

TABLE 3

Adhesion values of rubberized cords
2 + 2 × 0.25 mm after curing at 160° C.

| Type of coating | Adhesion force (Newtons) with increasing curing time (in minutes) | | | |
|---|---|---|---|---|
| | 15 | 25 | 35 | 60 |
| conventional brass | | | | |
| 0.15 μm − 61% Cu | 349 | 385 | 408 | 376 |
| 0.25 μm − 61% Cu | 385 | 450 | 420 | 415 |
| 0.25 μm − 71% Cu | 397 | 375 | 310 | 308 |
| 0.20 μm − 65% Cu | 382 | 452 | 408 | 338 |
| composite coating | | | | |
| 0.15 μm brass of 61% Cu + 0.0012 μm Fe | 358 | 438 | 422 | 404 |
| 0.25 μm brass of 61% Cu + 0.0020 μm Fe | 385 | 440 | 433 | 413 |
| 0.25 μm brass of 71% Cu + 0.0031 μm Fe | 387 | 405 | 385 | 385 |
| 0.20 μm brass of 65% Cu + 0.004 μm Fe | 388 | 430 | 447 | 405 |
| 0.20 μm brass of 65% Cu + 0.007 μm Ni | 305 | 433 | 440 | 393 |
| 0.25 μm brass of 71% Cu + 0.010 μm Ni | 253 | 375 | 388 | 372 |

The tabulated results show that a thin metal film of iron or nickel deposited on top of a brass coating is very suitable for maintaining high adhesion values over long curing times, regardless of brass composition. The beneficial effect is most pronounced in brass of high copper content.

EXAMPLE 4

In example 4 a tire rubber compound of tire manufacturer B was chosen for assessing the broad applicability of the coated cords of the present invention. The initial adhesion and steam aged adhesion were determined of vulcanized cords having a conventional brass coating, and a composite brass coating consisting of a common brass alloy layer covered by a metal film of iron, nickel or manganese.

A manganese metal film was electroplated on the brassed wire from a sulphate bath containing 100 g/l MnSO4. 2 aq (and 10 g/l boric acid) at a pH of 4–5 at 40° C.

TABLE 4

Adhesion values (Newtons) of rubberized
cords 2 + 2 × 0.25 mm in rubber compound B

| Coating type | Initial adhesion | Steam aged adhesion | |
|---|---|---|---|
| | | 16 hrs-120° C. | 32 hrs-120° C. |
| 0.25 μm brass of 71% Cu | 423 | 265 | 156 |
| 0.25 μm brass of 71% Cu + 0.0035 μm Fe | 468 | 363 | 230 |
| 0.25 μm brass of 71% Cu + 0.0065 μm Ni | 440 | 401 | 241 |
| 0.25 μm brass of 71% Cu + 0,0042 μm Mn | 403 | 338 | 233 |
| 0.20 μm brass of 64% Cu | 416 | 375 | 289 |
| 0.20 μm brass of 64% Cu + 0.0012 μm Fe | 421 | 426 | 364 |

TABLE 4-continued

| | Adhesion values (Newtons) of rubberized cords 2 + 2 × 0.25 mm in rubber compound B | | |
|---|---|---|---|
| | Initial | Steam aged adhesion | |
| Coating type | adhesion | 16 hrs-120° C. | 32 hrs-120° C. |
| 0.20 μm brass of 64% Cu + 0,0050 μm Ni | 444 | 403 | 351 |
| 0.20 μm brass of 64% Cu + 0,0030 μm Mn | 430 | 415 | 345 |

From table 4 it can be noticed that the composite brass coatings significantly improve the adhesion retention of vulcanized cord/rubber (compound B) after simulated heat and humidity ageing.

The examples and simulation test data clearly show that a composite coating characterized by an inner Cu-Zn or brass alloy layer and a distinct surface film of a metal is remarkably advantageous in improving the adhesion behaviour of reinforced rubber articles throughout the useful life of the vulcanized laminate in which the reinforcing elements (e.g. steel cord in a tire laminate) are plated with such composite brass layers Similar promising results were obtained by electrodeposition of a thin alloy film of NiMn or NiFe on top of the brass. For example, a NiFe-bath suitable for alloy plating of a NiFe-alloy comprising 10 to 30% Fe contains about 45 g/l of nickel and 3 to 5 g/l of iron (together with a hydroxycarboxylic acid stabilizer) and is operated at 55°-60° C., at a pH of 3-3.5 and current densities of 3-4 A/dm$^2$ or higher (with air agitation). A Ni-Mn alloy layer on top of the brass is electrodeposited from a Ni-sulfamate bath containing a variable amount of Mn-sulfamate as required for the desired alloy codeposition. The observed improvement in adhesion retention in these cases was at least 15%.

While certain representative embodiments and details have been shown for the purpose of illustrating the invention, it will be apparent to those skilled in the art that various changes and modifications may be made therein—in particular with respect to specific selections of multi-layer combinations of the previously mentioned metallic elements and alloys—without departing from the scope of the present invention.

We claim:

1. A reinforcement for vulcanizable rubber articles, comprising:
   (a) an elongated high carbon steel element;
   (b) a brass layer of substantially homogeneous α-structure and being substantially free of β-structure having a thickness of about 0.05 μm to about 0.5 μm covers said element and said layer comprising from about 55 percent by weight to about 75 percent by weight copper and from about 25 percent by weight to about 45 percent by weight zinc; and,
   (c) a rubber adherent film having a thickness of from about 0.0005 μm to about 0.05 μm covers said layer and said film selected from the group consisting of iron, manganese molybdenum, mandium, niobium, tantolum, tungsten and chromium and alloys thereof, nickel and binary alloys thereof selected from the group consisting of Ni-Fe, Ni-Mn, Ni-Cr, Ni-Zr and Ni-Co, and ternery nickel alloys comprising any two of said binary alloying elements.

2. A steel element according to claim 1 wherein said element is an elongated body of the group comprising a round wire, a flat wire, a shaped wire, a strip, a sheet, a strand of twisted wires or of substantially parallel wires, a fabric of wires or strands, and combinations of said elongated bodies.

3. A surface coated steel element according to claim 1, wherein said inner brass layer and said outer metal film are electroplated.

4. A surface coated steel element according to claim 1, wherein said inner brass layer is electroplated and said outer metal film is provided by one of ion plating, sputtering and vapour deposition in vacuum.

5. A reinforcement according to claim 1 wherein the thickness ratio of said film to said brass layer ranges from about 1/5000 to 1/10.

6. A reinforcement according to claim 5 wherein said film is electroplated.

7. A rubber article reinforced by a reinforcement according to claim 1.

8. A reinforcement according to claim 1 wherein said element is a wire and has a diameter of from 0.08 to 0.5 mm and a tensile strength of at least 2500 N/mm$^2$.

9. A pneumatic rubber tire reinforced by a steel wire according to claim 8.

10. A steel cord comprising a plurality of wires as claimed in claim 8.

11. A steel cord as claimed in claim 10 wherein said film is applied after twisting the wires into a cord structure.

12. A tire wire, comprising:
   (a) a high carbon steel wire;
   (b) a brass layer of substantially homogeneous α-structure which is substantially free of β-structure covers said wire and has a thickness of from about 0.05 μm to about 0.5 μm and said layer comprising from about 55 percent by weight to about 75 percent by weight copper and from about 25 percent by weight to about 45 percent by weight zinc; and,
   (c) a rubber adherent film covers said layer and has a thickness prior to drawing of the wire of about 0.0005 μm to about 0.05 μm and said film comprises a metal selected from the group consisting of iron, manganese, chromium, molybdenum, vanadium, niobium, tantalum and tungsten.

13. The cord of claim 12, wherein:
   (a) said brass layer being chemically treated to activate the surface thereof prior to application of said film thereto for assuring good surface coverage and adherence of said film to said layer.

14. The cord of claim 12, wherein:
   (a) said film having a thickness of from about 0.0002 to about 0.1 times the thickness of said layer.

15. The cord of claim 12, wherein:
   (a) said brass layer being applied to said wire by electroplating; and,
   (b) said film being applied to said brass laayer by electroplating.

16. A pneumatic tire reinforced by a wire of claim 12.

* * * * *